E. B. Requa's Combd Globe & Chimney for Lamps
4221
Fig. 1 REISSUED DEC 27 1870
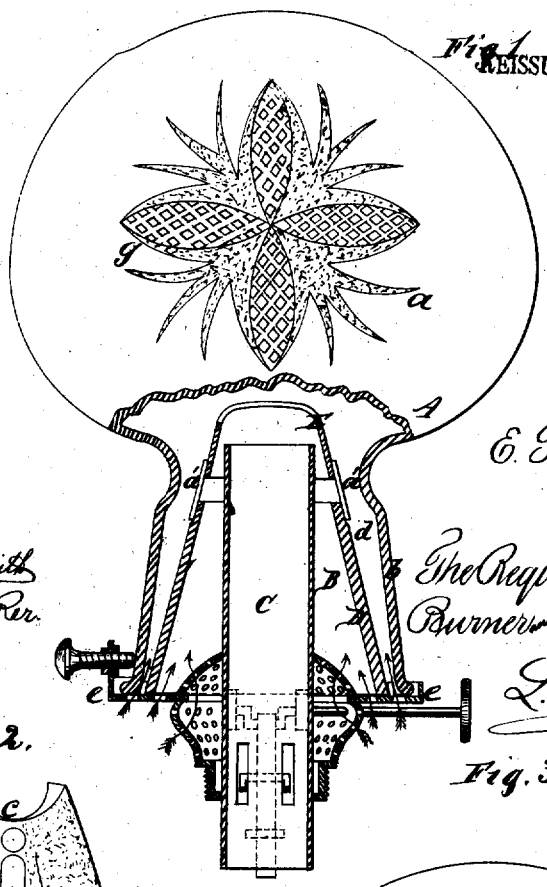
E. B. Requa
Inventor.
Witnesses.
Chas. H. Smith
Geo. D. Walker.
The Requa Patent Concave Burner and Chimney Co. assignees
L. W. Serrell
Atty
Fig. 2.
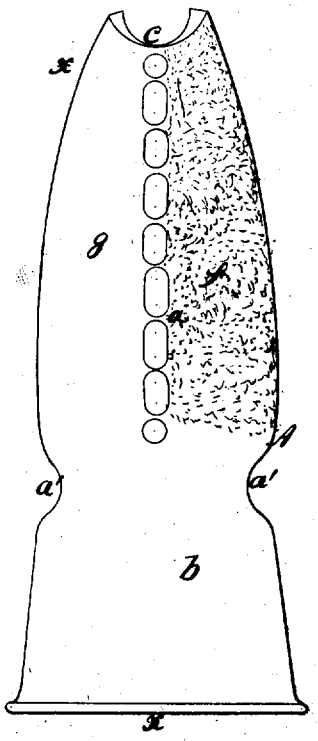
Fig. 3.
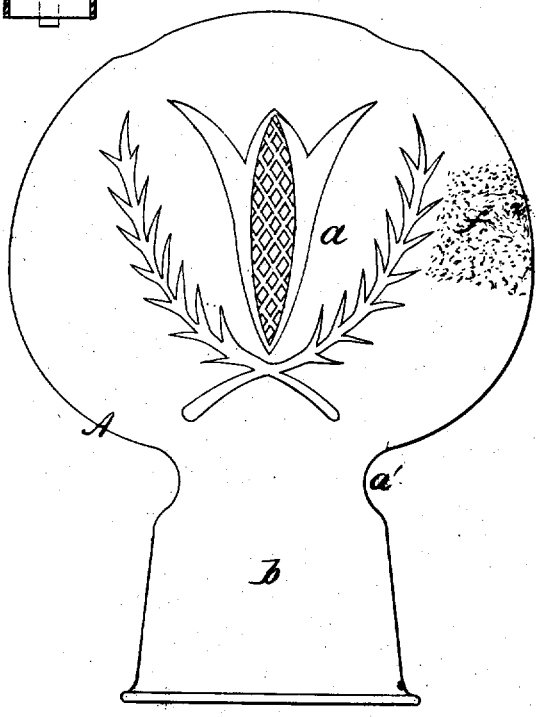

United States Patent Office.

THE REQUA PATENT CONCAVE BURNER AND CHIMNEY COMPANY, OF NEW YORK, N. Y., ASSIGNEE OF E. B. REQUA.

Letters Patent No. 37,773, dated February 24, 1863; reissue No. 4,221, dated December 27, 1870.

IMPROVEMENT IN LAMP-CHIMNEYS.

The Schedule referred to in these Letters Patent and making part of the same.

*To all whom it may concern:*

Be it known that E. B. REQUA, of Jersey City, in the county of Hudson and State of New Jersey, did invent a new and useful improvement in Chimneys for Lamps; and the following is hereby declared to be a full, clear, and exact description of the same.

In the drawing—

Figure 1 is a side view of the chimney, partly in section, as indicated by the line *x x*, fig. 2, and applied to a lamp-burner;

Figure 2, an edge view of the same; and

Figure 3 shows the opposite side to that represented in fig. 1.

This invention relates to a lamp-chimney adapted to a flat wick-burner, for coal-oil and other hydrocarbons, the chimney itself being flattened in the direction in which the flame spreads, said flattened portion approximating in form an oblate spheroid, and rising above a base and contracted neck.

A represents the chimney, which is of glass, having the parts *a b*, the former approximating in form to an oblate spheroid, the upper part being rather more flattened or narrower than the lower part, as seen in fig. 2.

The chimney has an opening, *c*, to admit of the passage of air through it, the opening *c* being directly over the top of the flame on the cone of the burner.

The part *b* of the chimney, which may be termed the base, is of slightly conical form, and of such a length that, when applied to or fitted on a burner, it will extend upward about half way to the top of the cone thereof, and at the lower edge of the base a flange is shown, so that the chimney may be held to the burner as usual.

B, fig. 1, is the burner, which is screwed into the top of the fountain of the lamp as usual.

C is the wick-tube;

D, a conical jacket encompassing the same; and

E, a cone or deflector attached to the upper end of the jacket D.

These parts, which comprise the burner, may be seen in a patent previously granted, May 6, 1862.

The upper part of the base *b* is sunk inward all around it, as shown at *a'*, to form a neck, and this contracts the space or air-passage *d* all around the cone E.

The base *b* and neck *a* are sufficiently large to admit of an air-passage, *d*, of requisite dimensions, between the jacket and neck, as shown in fig. 1; and the flange *e* of the burner, upon which the jacket and base rest, is perforated, to admit of air passing upward into the jacket and neck, as will be fully understood by referring to fig. 1.

The contracting of the air-passage *d* all around the cone E quickens the draught in the vicinity of the base of the flame, and insures a good draught through the whole chimney and an abundant supply of oxygen to the flame, while the oblate spheroidal form of the upper part *a* of the chimney insures a nearly equal air-space all around the flame, the flat sides of the latter being opposite the flat sides of *a*.

One side of the chimney or globe is ground, as shown at *f*, in figs. 2 and 3, and the opposite side, *g*, is left plain or clear. When, therefore, a subdued light is desired, the lamp is turned so that the ground side *f* will be opposite to the person using the lamp, and when a full light is desired, the plain or clear side is turned in said position. This is a very great convenience, as many persons cannot use a bright light without a ground globe or chimney, and others again prefer a bright or intense light. The surface may be also ornamented, as shown, if desired.

This chimney admits of the lamp being carried about from place to place with the greatest facility, and at the same time combines all the advantages of the ordinary glass globes hitherto used in connection with a glass chimney.

What is claimed, and to be secured by Letters Patent, is—

1. A lamp-chimney made with a circular base, *b*, a contraction, at *a'*, and a bulb flattened in the direction in which the flame spreads, substantially as specified.

2. A lamp-chimney made with the conical base *b*, a flange at its lower edge, and the contraction *a'* between said base *b* and the flattened bulb, as and for the purposes specified.

3. A glass lamp-chimney made with one side roughened or ground, as and for the purposes set forth.

4. A glass lamp-chimney formed with the base *b* and contraction *a'*, in combination with a lamp-burner having a flat wick, substantially as set forth.

Dated December 17, 1869.

MARSHALL LEFFERTS,
*President.*

JOHN D. AYMAR,
*Secretary.*

Witnesses:
CHAS. H. SMITH,
GEO. T. PINCKNEY.